(12) United States Patent
Yoshima et al.

(10) Patent No.: US 10,505,223 B2
(45) Date of Patent: Dec. 10, 2019

(54) COMPOSITE ELECTROLYTE, SECONDARY BATTERY, BATTERY PACK, AND VEHICLE

(71) Applicant: KABUSHIKI KAISHA TOSHIBA, Minato-ku (JP)

(72) Inventors: Kazuomi Yoshima, Yokohama Kanagawa (JP); Yasuhiro Harada, Isehara Kanagawa (JP); Norio Takami, Yokohama Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 128 days.

(21) Appl. No.: 15/691,603

(22) Filed: Aug. 30, 2017

(65) Prior Publication Data
US 2018/0277896 A1 Sep. 27, 2018

(30) Foreign Application Priority Data

Mar. 21, 2017 (JP) ................. 2017-054667

(51) Int. Cl.
*H01M 2/10* (2006.01)
*H01M 2/34* (2006.01)
(Continued)

(52) U.S. Cl.
CPC ..... *H01M 10/0565* (2013.01); *H01M 2/1077* (2013.01); *H01M 2/145* (2013.01);
(Continued)

(58) Field of Classification Search
CPC ...... H01M 2/1077; H01M 2/145; H01M 2/16; H01M 2/1646; H01M 2/348;
(Continued)

(56) References Cited

U.S. PATENT DOCUMENTS

2006/0008700 A1 1/2006 Yong et al.
2007/0072080 A1 3/2007 Inagaki et al.
(Continued)

FOREIGN PATENT DOCUMENTS

JP 2008-004459 1/2008
JP 2008-210791 9/2008
(Continued)

OTHER PUBLICATIONS

Y. C. Jung, et al., "All Solid-State Lithium Batteries Assembled with Hybrid Solid Electrolytes", Journal of the Electrochemical Society, vol. 162, No. 4, pp. A704-A710, 2015.
(Continued)

*Primary Examiner* — Brittany L Raymond
(74) *Attorney, Agent, or Firm* — Oblon, McClelland, Maier & Neustadt, L.L.P.

(57) ABSTRACT

According to one embodiment, a composite electrolyte is provided. The composite electrolyte includes inorganic compound particles having lithium ion conductivity at 25° C. of $1 \times 10^{-10}$ S/cm or more and including a solvent, an organic electrolyte, and a binder. An average particle diameter of the inorganic compound particles is 0.1 μm or more and less than 5 μm, and a ratio of a weight of the solvent to a total weight of the inorganic compound particles and the solvent is 0.1% by weight or more and less than 8% by weight.

20 Claims, 8 Drawing Sheets

(51) Int. Cl.
- *H01M 10/0525* (2010.01)
- *H01M 10/0565* (2010.01)
- *H01M 2/14* (2006.01)
- *H01M 2/16* (2006.01)
- *H01M 10/056* (2010.01)
- *H01M 10/0567* (2010.01)

(52) U.S. Cl.
CPC ........... *H01M 2/16* (2013.01); *H01M 2/1646* (2013.01); *H01M 2/348* (2013.01); *H01M 10/056* (2013.01); *H01M 10/0525* (2013.01); *H01M 10/0567* (2013.01); *H01M 2200/10* (2013.01); *H01M 2220/20* (2013.01); *H01M 2300/0082* (2013.01)

(58) Field of Classification Search
CPC ........... H01M 10/0525; H01M 10/056; H01M 10/0565; H01M 10/0567; H01M 10/0569; H01M 2300/0085; H01M 2300/0088; H01M 2200/10; H01M 2220/20
See application file for complete search history.

(56) References Cited

U.S. PATENT DOCUMENTS

| | | |
|---|---|---|
| 2009/0111026 A1 | 4/2009 | Kim et al. |
| 2011/0281150 A1 | 11/2011 | Yong et al. |
| 2014/0287285 A1* | 9/2014 | Inagaki ................. H01M 4/485 429/90 |
| 2016/0164138 A1* | 6/2016 | Han ................. H01M 10/0565 429/316 |
| 2017/0077547 A1 | 3/2017 | Takami et al. |

FOREIGN PATENT DOCUMENTS

| | | |
|---|---|---|
| JP | 2010-006681 | 1/2010 |
| JP | 2015-088369 | 5/2015 |
| JP | 2015-220096 | 12/2015 |
| JP | 2016-117640 | 6/2016 |
| KR | 10-2007-0036707 A | 4/2007 |
| KR | 10-2016-0068464 A | 6/2016 |
| WO | WO 2017/046915 | 3/2017 |
| WO | WO 2017/046917 | 3/2017 |

OTHER PUBLICATIONS

Y. C. Jung, et al., "Ceramic Separators Based on Li+-conducting Inorganic Electrolyte for High-performance Lithium-ion Batteries with Enhanced Safety", Journal of Power Sources, vol. 293,pp. 675-683,2015.

K. Yoshima, et al., "12V-Class Bipolar $LiMn_{1-y}Fe_yPO_4/Li_4Ti_5O_{12}$ Battery with an Oxide-Based Solid-State Electrolyte Layer", 2015 ECS The Electrochemical—Society.

* cited by examiner

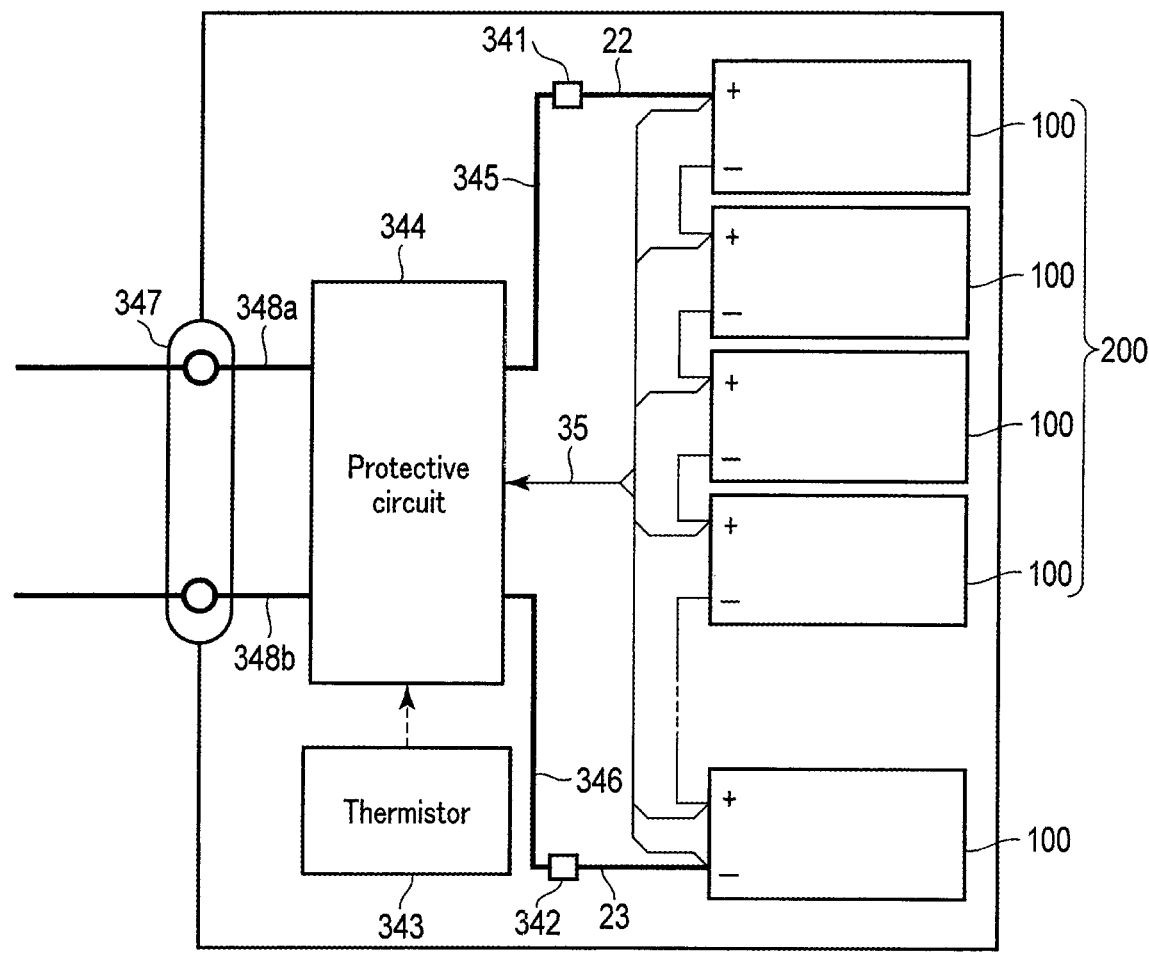
F I G. 8
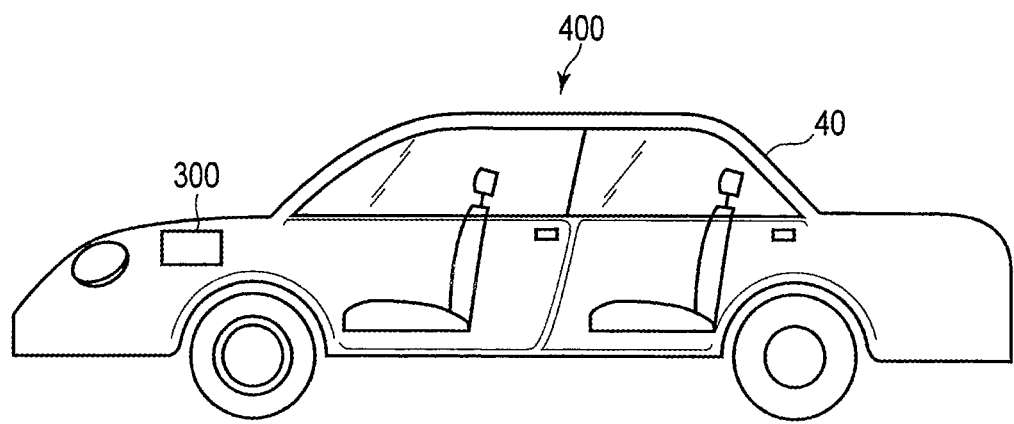
F I G. 9

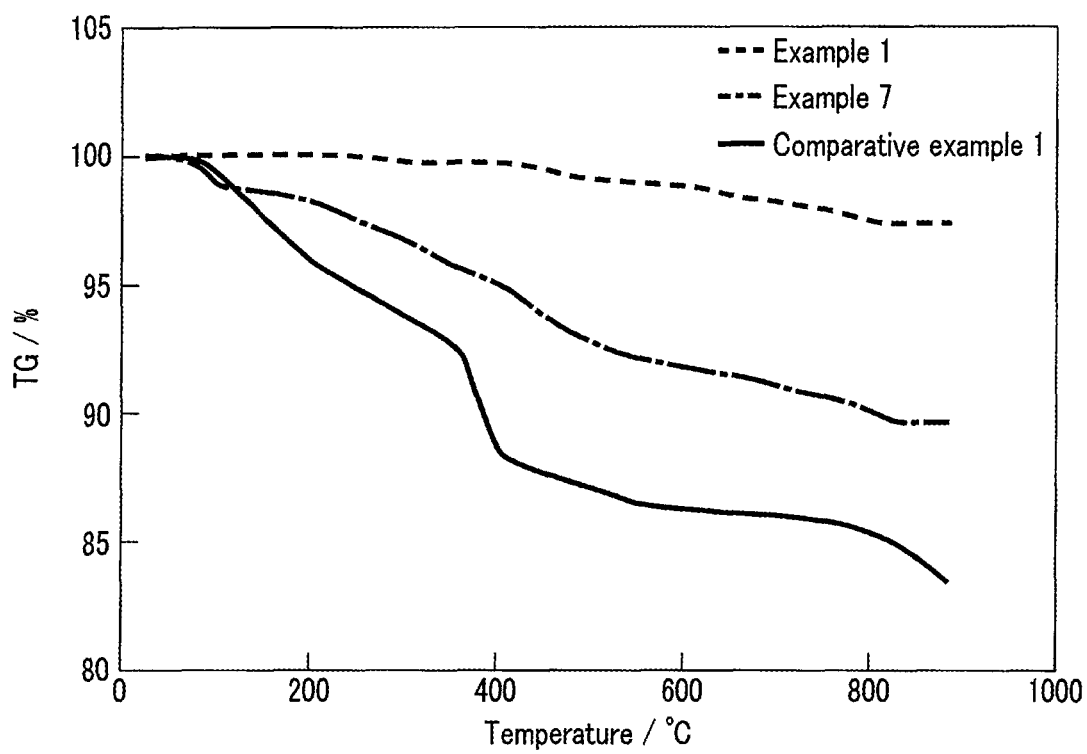
F I G. 11
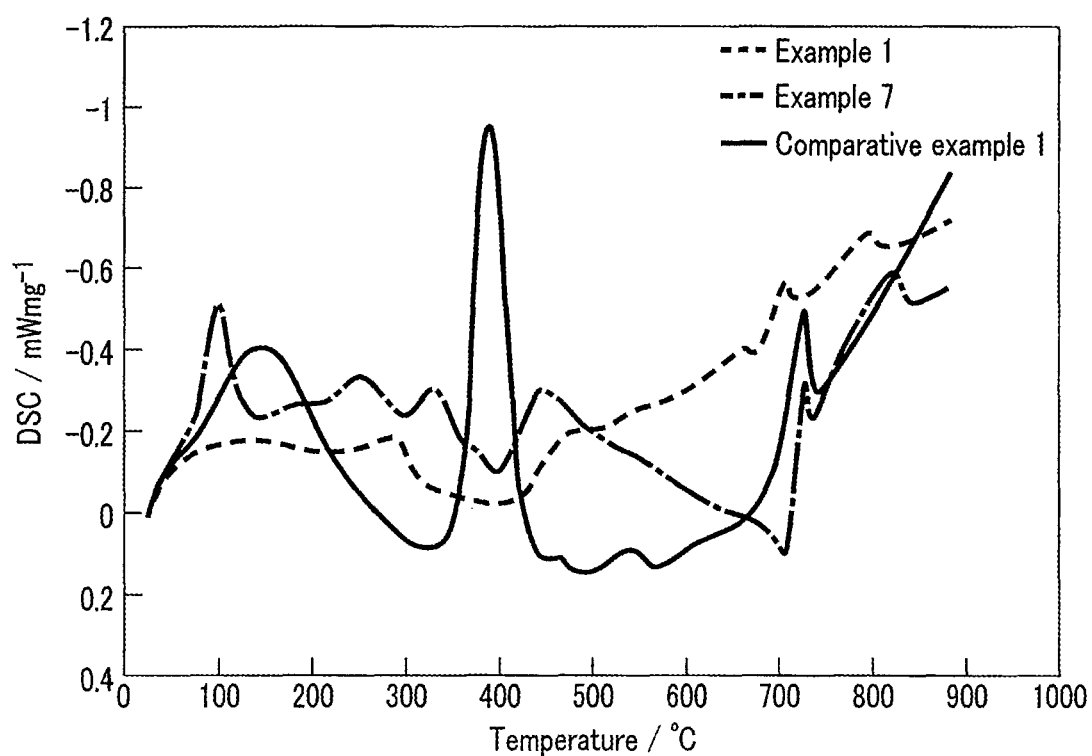
F I G. 12

COMPOSITE ELECTROLYTE, SECONDARY BATTERY, BATTERY PACK, AND VEHICLE

CROSS-REFERENCE TO RELATED APPLICATIONS

This application is based upon and claims the benefit of priority from Japanese Patent Application No. 2017-054667, filed Mar. 21, 2017, the entire contents of which are incorporated herein by reference.

FIELD

Embodiments described herein relate generally to a composite electrolyte, a secondary battery, a battery pack, and a vehicle.

BACKGROUND

In recent years, researches and developments of secondary batteries such as lithium ion secondary batteries and nonaqueous electrolyte secondary batteries as high energy density batteries have gathered pace. Secondary batteries are expected as power sources for vehicles such as hybrid automobiles and electric automobiles, or for uninterruptible power supplies for mobile phone base stations. In particular, all solid-state lithium ion secondary batteries are actively researched as automotive batteries, and their high safety has attracted attention.

Compared with a lithium ion secondary battery using a nonaqueous electrolyte, the all solid-state lithium ion secondary battery uses a solid electrolyte, and therefore, there is no fear of ignition. However, a high capacity all solid-state lithium ion secondary battery has not yet been put into practical use at present. One of the reasons for this is that the interface resistance between the solid electrolyte and the active material is high. Since both are solid, it is relatively easy to bond the solid electrolyte and the active material by applying heat. However, since the active material swells and shrinks due to insertion and extraction of lithium, the active material is peeled off from the solid electrolyte when repeatedly charged and discharged, so that good cycle performance cannot be obtained in some cases.

Thus, it is necessary to suppress an influence of swelling/contraction of the active material, and to form a good interface between the solid electrolyte and the active material.

BRIEF DESCRIPTION OF THE DRAWINGS

FIG. 8 is a block diagram showing an example of an electric circuit of the battery pack shown in FIG. 7;

FIG. 9 is a cross-sectional view schematically showing an example of a vehicle according to a fourth embodiment;

FIG. 11 is a graph showing results of thermogravimetric measurements according to Examples and Comparative Examples; and FIG. 12 is a graph showing results of differential scanning calorimetry according to Examples and Comparative Examples.

DETAILED DESCRIPTION

Figure 1:
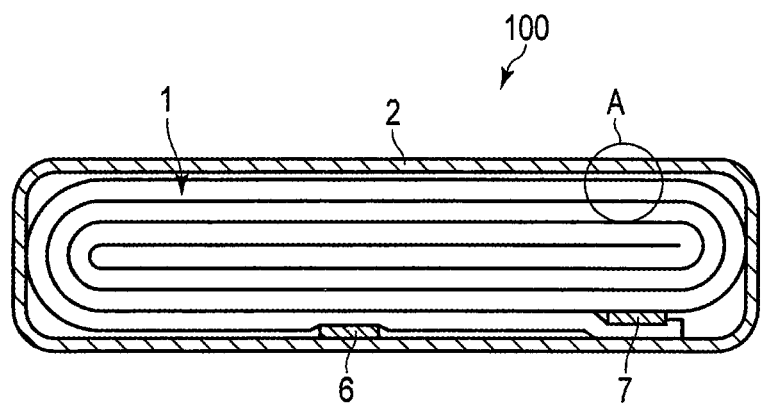
FIG. 1 is a cross-sectional view schematically showing an example of a secondary battery according to a first embodiment.

According to a first embodiment, a composite electrolyte is provided. The composite electrolyte includes inorganic compound particles having lithium ion conductivity at 25° C. of $1 \times 10^{-10}$ S/cm or more and including a solvent, an organic electrolyte, and a binder. The average particle diameter of the inorganic compound particles is 0.1 μm or more and less than 5 μm, and the ratio of the weight of the solvent to the total weight of the inorganic compound particles and the solvent is 0.1% by weight or more and less than 8% by weight.

According to a second embodiment, a secondary battery is provided. The secondary battery includes the composite electrolyte according to the first embodiment.

According to a third embodiment, a battery back is provided. The battery pack includes the secondary battery according to the second embodiment.

According to a fourth embodiment, a vehicle is provided. The vehicle includes the battery pack according to the third embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to the first embodiment, a composite electrolyte is provided. The composite electrolyte includes inorganic compound particles having lithium ion conductivity at 25° C. of $1 \times 10^{-10}$ S/cm or more and including a solvent, an organic electrolyte, and a binder. The average particle diameter of the inorganic compound particles is 0.1 μm or more and less than 5 μm, and the ratio of the weight of the solvent to the total weight of the inorganic compound particles and the solvent is 0.1% by weight or more and less than 8% by weight.

The composite electrolyte is an electrolyte including inorganic compound particles having lithium ion conductivity, an organic electrolyte, and a binder. The composite electrolyte may consists of inorganic compound particles having lithium ion conductivity, an organic electrolyte, and a binder. For example, when a mixture of the organic electrolyte and the binder is heated, a gel-like electrolyte can be obtained. The composite electrolyte may contain a gel-like composition containing an organic electrolyte and a binder. When this gel is compounded with inorganic compound particles having lithium ion conductivity, the lithium ion conductivity is improved as compared with the case where only a plurality of inorganic compound particles are present or where only gel is present. It is considered that this is because movement of lithium ions between inorganic compound particles is promoted by a gel containing an organic electrolyte.

If the lithium ion conductivity of the inorganic compound particles is high, the lithium ions in the particles are easily moved, and therefore, the lithium ion conductivity as a composite electrolyte is further enhanced. The inorganic compound particles contained in the composite electrolyte according to the present embodiment have lithium ion conductivity at 25° C. of $1 \times 10^{-10}$ S/cm or more.

Lithium ions present in the inorganic compound particles can freely move in accordance with an external electric field. For example, when the inorganic compound particles and the gel are arranged as solid electrolytes between the positive electrode and the negative electrode, polarization is generated at the contact interface between the inorganic compound particles and the gel upon receiving the potential difference between the positive electrode and the negative electrode. Due to this polarization, lithium ions are gathered on the surface of the inorganic compound particles, and therefore, a region where the concentration of lithium ions is high is generated in the particles. As a result, it is considered that movement of lithium ions from one particle to another is promoted.

However, if the average particle diameter of the inorganic compound particles is too large, the number or the volume of voids among the particles tends to increase, so that it takes time for diffusion of lithium ions in the composite electrolyte and the rate performance and the low temperature performance are lowered. Thus, the average particle diameter of the inorganic compound particles according to the embodiment is 0.1 µm or more and less than 5 µm. When the average particle diameter of the inorganic compound particles is less than 5 µm, the diffusion speed of lithium ions can be increased. The average particle diameter of the inorganic compound particles is preferably 0.1 µm or more and less than 2 µm.

If a large amount of solvent is present inside or on the surface of the inorganic compound particles when gelling the organic electrolyte with a binder, gelation becomes difficult, or the time to gelation becomes long.

As described above, in order to gelate the organic electrolyte, an electrolytic solution containing a polymer material is heated, for example. However, if the time until gelation is long, the electrolytic solution deteriorates. The deterioration of the electrolytic solution is, for example, decomposition of electrolyte salt.

In the gelation, side reaction with the electrolytic solution can occur in the positive electrode and the negative electrode. The side reaction is mainly the formation of organic matter on an electrode surface. This organic matter is a factor for increasing the resistance of the electrode. Thus, since the side reaction can be suppressed as the gelation time is shorter, the electrode resistance is reduced, and it is possible to suppress deterioration of rate performance and low temperature performance.

In the composite electrolyte according to this embodiment, in order to easily gelate the organic electrolyte and the binder, the ratio of the weight of the solvent to the total weight of the inorganic compound particles and the solvent contained in the inorganic compound particles is within a range of 0.1% by weight or more and less than 8% by weight. A method for measuring the amount of the solvent in the inorganic compound particles will be described later.

The solvent contained in the inorganic compound particles includes a solvent present inside the inorganic compound particles and a solvent present on the particle surface. The solvent present inside the inorganic compound particles is present, for example, in a state where molecules of the inorganic compound and molecules of the solvent are chemically bonded to each other. The solvent present on the particle surface is present, for example, in a state of being chemically bonded to the molecule of the inorganic compound on the particle surface or physically adsorbed on the particle surface.

According to the composite electrolyte described above, since it is possible to shorten the gelation time to reduce the electrode resistance and to increase the conductivity of lithium ions, it is possible to obtain a composite electrolyte excellent in rate performance and low temperature performance.

The composite electrolyte according to this embodiment will be described in detail.

The inorganic compound particles have lithium ion conductivity at 25° C. of $1 \times 10^{-10}$ S/cm or more. The lithium ion conductivity of the inorganic compound particles at 25° C. is preferably $1 \times 10^{-6}$ S/cm or more. When the lithium ion conductivity of the inorganic compound particles at 25° C. is $1 \times 10^{-6}$ S/cm or more, the lithium ion concentration near the particle surface tends to be high, so that the rate performance and the low temperature performance are further enhanced. An upper limit value of the lithium ion conductivity is $1 \times 10^{-2}$ S/cm according to an example. The lithium ion conductivity is preferably within a range of $1 \times 10^{-5}$ S/cm to $1 \times 10^{-2}$ S/cm.

The inorganic compound particles include, for example, at least one selected from the group consisting of a sulfide-based $Li_2SeP_2S_5$ glass ceramic, an inorganic compound having a perovskite type structure (for example, $Li_{0.5}La_{0.5}TiO_3$), an inorganic compound having a LiSICON type structure, LATP ($Li_{1+x}Al_xTi_{2-x}(PO_4)_3$) ($0.1 \leq x \leq 0.4$) and $Li_{3.6}Si_{0.6}PO_4$ having a NASICON skeleton, amorphous LIPON ($Li_{2.9}PO_{3.3}N_{0.46}$), and an inorganic compound having a garnet type structure. The inorganic compound used as inorganic compound particles may be only one type, or two or more types may be used in combination. The inorganic compound particles may include a mixture of plural types of inorganic compounds.

If the inorganic compound particles contain a sulfur element, the sulfur component is dissolved in the organic electrolyte described later, which is not preferable. It is preferable that the inorganic compound particles do not contain a sulfur element.

Preferred inorganic compound particles are oxides such as LATP having a NASICON skeleton, amorphous LIPON, and garnet type LLZ ($Li_7La_3Zr_2O_{12}$).

Among them, the inorganic compound particles are preferably inorganic compounds having a garnet type structure. It is preferable that the inorganic compound particles are an inorganic compound having a garnet type structure because it has high Li ion conductivity and reduction resistance and has a wide electrochemical window. Examples of the inorganic compound having a garnet type structure include $Li_{5+x}A_yLa_{3-y}M_2O_{12}$ (A is at least one selected from the group consisting of Ca, Sr and Ba, and M is at least one selected from the group consisting of Nb and Ta), $Li_3M_{2-x}Zr_2O_{12}$ (M is at least one selected from the group consisting of Ta and Nb), $Li_{7-3x}Al_xLa_3Zr_3O_{12}$, and $Li_7La_3Zr_2O_{12}$. In the above inorganic compounds, a range of x is, for example, $0 \leq x < 0.8$, preferably $0 \leq x \leq 0.5$. A range of y is, for example, $0 \leq y < 2$. The inorganic compound having a garnet type structure may include one of these compounds or contain a mixture of two or more of these compounds. Among them, since $Li_{6.25}Al_{0.25}La_3Zr_3O_{12}$ and $Li_7La_3Zr_2O_{12}$ have high ion conductivity and are electrochemically stable, they have excellent discharge performance and cycle life performance. Moreover, these compounds have an advantage that they are chemically stable against the organic electrolyte described later even though they are made into fine particles.

The average particle diameter of the inorganic compound particles is in a range of 0.1 μm or more and less than 5 μm, preferably in a range of from 0.1 μm to 2 μm.

The average particle diameter of the inorganic compound particles can be measured with a scanning electron microscope (SEM).

The type of the solvent contained in the inorganic compound particles is not particularly limited, but may be at least one selected from the group consisting of a polar solvent such as water, a nonpolar organic solvent such as ethanol, isopropanol, ethylene glycol and acetone, and a polar organic solvent such as N-methylpyrrolidone. The solvent contained in the inorganic compound particles is preferably an organic solvent. When the solvent contained in the inorganic compound particles is an organic solvent, the gelation time is less likely to be extended, and the electrolytic solution is less likely to be deteriorated. The inorganic compound particles may contain only one type of solvent or two or more types of solvents.

The ratio of the weight of the solvent contained in the inorganic compound particles to the total weight of the inorganic compound particles and the solvent contained in the inorganic compound particles is 0.1% by weight or more and less than 8% by weight. Although it is preferable that this ratio is lower, the lithium ions contained in the inorganic compound particles bond with water in the air on the particle surface, so it is difficult to make the ratio 0% by weight. This ratio is preferably from 0.2% by weight to 5% by weight, and more preferably from 0.1% by weight to 2% by weight. In this case, the gelation time can be further shortened, and excellent rate performance and low temperature performance can be achieved.

The amount of the solvent contained in the inorganic compound particles can be adjusted as follows, for example.

When dry pulverization is adopted as a pulverization method for obtaining inorganic compound particles by pulverization, the amount of the solvent contained in the inorganic compound particles can be reduced as compared with the case where wet pulverization is adopted, which is preferable. Wet pulverization using a bead mill or the like is advantageous in that the yield is high, but the amount of the solvent contained in the inorganic compound particles tends to be too large.

Even when wet pulverization is adopted, after pulverization, by firing to such an extent that the inorganic compound particles are not sintered, the ratio of the weight of the solvent contained in the inorganic compound particles to the total weight of the inorganic compound particles and the solvent contained in the inorganic compound particles can be set to 0.1% by weight or more and less than 8% by weight. The firing to the extent that the inorganic compound particles are not sintered is carried out, for example, at a temperature within a range of 300° C. to 600° C. for 12 hours.

If the inorganic compound particles are sintered, the average particle diameter of the inorganic compound particles increases. In this case, the number or the volume of voids among these particles increases, which is undesirable because the ion conductivity of the composite electrolyte decreases. Moreover, if the average particle diameter of the inorganic compound particles is too large, it becomes difficult to make the composite electrolyte sufficiently thin when providing the composite electrolyte between the positive electrode and the negative electrode. As a result, the distance between the positive electrode and the negative electrode increases, and the diffusion resistance of the lithium ions increases, which is not preferable.

When dry pulverization is adopted, the above ratio can be achieved without performing firing to the extent that the inorganic compound particles are not sintered, which is preferable.

In addition, even when wet pulverization is adopted, if a solvent having a large molecular size is used as a solvent used for pulverization, the amount of the solvent taken into the inorganic compound particles is small. Thus, the above ratio can be achieved without performing firing to the extent that the inorganic compound particles are not sintered.

A method of measuring the weight of the solvent contained in the inorganic compound particles will be described.

First, an electrode part is taken out from a battery pack described later, and a portion of a composite electrolyte formed on a surface of the positive electrode or on a surface of the negative electrode is scraped off. The organic electrolyte is washed with a solvent such as diethyl carbonate and dried to obtain inorganic compound particles. In order to specify the amount of the solvent contained in the obtained inorganic compound particles, thermogravimetry (TG) is performed.

In the measurement, the temperature is increased from room temperature to 900° C. under the condition of 10° C./min, and weight loss is measured. Moreover, at the same time, by performing differential scanning calorimetry (DSC), not only the weight of the solvent present on the surface of the inorganic compound particles but also the inside of the inorganic compound particle, that is, the temperature attained when the solvent taken into the crystal is decomposed are clearly shown.

For example, the solvent adsorbed on the particle surface is decomposed in a range of 80° C. to 150° C., the solvent incorporated into the crystal is decomposed in a range of 400° C. to 500° C., and the binder is decomposed in a range of 150° C. to 250° C.; therefore, weight loss due to TG is observed within each temperature range, and endothermic behavior is observed by DSC. By subtracting the weight of the binder from the total value of the decreased weights, the weight of the solvent contained in the inorganic compound particles can be measured.

The ratio of the total weight of the inorganic compound particles and the solvent contained in the inorganic compound particles to the weight of the composite electrolyte is, for example, in a range of 80% by weight to 99% by weight. This ratio is preferably in a range from 90% by weight to 98% by weight. When the ratio of the total weight of the inorganic compound particles and the solvent contained in the inorganic compound particles to the weight of the composite electrolyte is within this range, the effect of suppressing decomposition of lithium salt contained in the organic electrolyte can be provided.

The composite electrolyte may contain other particles having lithium ion conductivity of less than $1 \times 10^{-10}$ S/cm. Other particles having lithium ion conductivity of less than $1\times10^{-10}$ S/cm are preferably at least one selected from the group consisting of aluminum oxide, zirconium oxide, silicon oxide and magnesium oxide from the viewpoints of high resistance to reduction and low cost, for example. Also, when other particles are metal oxides such as titanium oxide, niobium oxide, tantalum oxide, hafnium oxide, yttrium oxide, gallium oxide and germanium oxide, and lanthanoid oxides such as lanthanum oxide, similar effects can be obtained. The other particles may be one type or two or more types selected from the above compounds.

The organic electrolyte contains an organic solvent and an electrolyte salt. The organic electrolyte contains, for example, at least one organic solvent exhibiting ion conductivity and selected from propylene carbonate, ethylene carbonate, diethyl carbonate, and methylethyl carbonate. When these organic solvents are used, there is an advantage that the above inorganic compounds are less likely to melt and can be stably present.

The electrolyte salt preferably contains lithium salt such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$) and bistrifluoromethylsulfonylimide lithium [$LiN(CF_3SO_2)_2$], or a mixture thereof. The organic electrolyte may contain other electrolyte salt.

The ratio of the weight of the organic electrolyte to the weight of the composite electrolyte is, for example, in a range of 0.1% by mass to 20% by mass, preferably in a range of 1% by mass to 10% by mass. When the ratio of the weight of the organic electrolyte to the weight of the composite electrolyte is within this range, a lithium ion conduction path, through which lithium ions are liable to be conducted, is formed on the surface of the inorganic compound, and it is possible to form a good interface between the composite electrolyte as a solid electrolyte and the active material, so that the effect of improving the high temperature durability and the cycle life of the battery can be obtained.

The composite electrolyte contains a binder. The composite electrolyte may further contain other additives.

The binder is, for example, a polymer body which gels with an organic solvent such as carbonates. Examples of binders include polyacrylonitrile (PAN), polyethylene oxide (PEO), polyvinylidene fluoride (PVdF), and polymethyl methacrylate. One of the above binders may be used alone, or plural of them may be used in combination.

The ratio of the weight of the binder to the weight of the composite electrolyte is, for example, in a range of 0.1% by weight to 10% by weight, preferably in a range of 0.5% by weight to 5% by weight. When the ratio of the weight of the binder to the weight of the composite electrolyte is excessively low, since the viscosity of the gelled organic electrolyte becomes insufficient, it is impossible to hold the inorganic compound particles to each other, so that the mechanical strength of the composite electrolyte lowers, or the composite electrolyte tends to be peeled off from the electrode. If the ratio is excessively high, movement of lithium ions is inhibited, and the diffusion resistance of ions tends to increase.

The ion conductivity of the composite electrolyte is, for example, in a range of 0.1 mS/cm to 20 mS/cm, preferably in a range of 0.5 mS/cm to 10 mS/cm. Since the organic electrolyte contained in the composite electrolyte covers at least a portion of the solid electrolyte and is properly gelled, the above ion conductivity can be achieved. Higher ion conductivity is preferable because the rate performance is improved.

According to the first embodiment, a composite electrolyte is provided. The composite electrolyte includes inorganic compound particles having lithium ion conductivity at 25° C. of $1\times10^{-10}$ S/cm or more and including a solvent, an organic electrolyte, and a binder. The average particle diameter of the inorganic compound particles is 0.1 μm or more and less than 5 μm, and the ratio of the weight of the solvent to the total weight of the inorganic compound particles and the solvent is 0.1% by weight or more and less than 8% by weight. In such a composite electrolyte, the gelation time can be shortened to reduce the electrode resistance, and the conductivity of lithium ions can be increased; therefore, it is possible to realize a secondary battery excellent in rate performance and low temperature performance.

Second Embodiment

According to the second embodiment, a secondary battery is provided. The secondary battery includes a positive electrode, a negative electrode, and the composite electrolyte according to the first embodiment. The secondary battery may further include a container member configured to store the positive electrode, the negative electrode, and the composite electrolyte. The secondary battery may further include a negative electrode terminal electrically connected to the negative electrode and a positive electrode terminal electrically connected to the positive electrode.

Hereinafter, the positive electrode, the negative electrode, the container member, the negative electrode terminal, and the positive electrode terminal will be described in detail.

(1) Positive Electrode

The positive electrode can include a positive electrode current collector and a positive electrode active material layer. The positive electrode active material layer may be formed on both surfaces or one surface of the positive electrode current collector. The positive electrode active material layer may contain a positive electrode active material, and optionally a conductive agent and a binder.

As the positive electrode current collector, it is preferable to use an aluminum foil or an aluminum alloy foil having a purity of 99% or more. The aluminum alloy is preferably an alloy containing an aluminum component and one or more elements selected from the group consisting of iron, magnesium, zinc, manganese, and silicon. For example, an Al—Fe alloy, an Al—Mn-based alloy, and an Al—Mg-based alloy can obtain higher strength than that of aluminum.

A content of transition metal such as aluminum, nickel in an aluminum alloy, and chromium is preferably 100 ppm or less (including 0 ppm). For example, when an Al—Cu-based alloy is used, although the strength is enhanced, the corrosion resistance is deteriorated, and therefore, the Al—Cu-based alloy is unsuitable as a current collector.

The aluminum purity is more preferably in a range of 99.99% to 99.0%. Within this range, it is possible to reduce a decrease in cycle life caused by the electrolyte raised to high temperatures by dissolution of an impurity element contained in the positive electrode current collector.

Examples of the positive electrode active material include a lithium manganese composite oxide, a lithium nickel composite oxide, a lithium cobalt aluminum composite oxide, a lithium nickel cobalt manganese composite oxide, a spinel-type lithium manganese nickel composite oxide, a lithium manganese cobalt composite oxide, an olivine-type lithium iron phosphate ($LiFePO_4$), and lithium phosphoric acid manganese ($LiMnPO_4$).

Examples of the positive electrode active material include lithium manganese composite oxides such as $Li_xMn_2O_4$ and $Li_xMnO_2$, lithium nickel aluminum composite oxides such as $Li_xNi_{1-y}Al_yO_2$, lithium cobalt composite oxides such as $Li_xCoO_2$, lithium nickel cobalt composite oxides such as $Li_xNi_{1-y-z}Co_yMn_zO_2$, lithium manganese cobalt composite oxides such as $Li_xMn_yCo_{1-y}O_2$, spinel-type lithium manganese nickel composite oxides such as $Li_xMn_{2-y}Ni_yO_4$, lithium phosphorus oxides having an olivine structure, such as $Li_xFePO_4$, $Li_xFe_{1-y}Mn_yPO_4$ and $Li_xCoPO_4$, and fluorinated iron sulfate such as $Li_xFeSO_4F$. A range of x satisfies 0<x≤1, unless otherwise specified. A range of y satisfies 0<y<1, unless otherwise specified.

These are preferable because high positive electrode potential can be obtained. Especially, according to a lithium nickel aluminum composite oxide, a lithium nickel cobalt manganese composite oxide, and a lithium manganese cobalt composite oxide, a reaction with an electrolyte under high-temperature environment can be suppressed, and the battery life can be significantly increased. Particularly, a lithium nickel cobalt manganese composite oxide represented by $Li_xNi_{1-y-z}Co_yMn_zO_2$ (0<x≤1, 0<y<0.5, and 0<z<0.5) is preferable. By using the lithium nickel cobalt manganese composite oxide, durability in a high-temperature environment can be further enhanced.

Examples of a conductive agent used for enhancing electron conductivity and suppressing contact resistance with the current collector include acetylene black, carbon black, and graphite.

Examples of a binder for binding an active material and the conductive agent include polytetrafluoroethylene (PTFE), polyvinylidene fluoride (PVdF), and fluororubbers.

The blending ratio of the positive electrode active material in the positive electrode active material layer, the conductive agent, and the binder is preferably from 80% by weight to 95% by weight for the positive electrode active material, from 3% by weight to 18% by weight for the conductive agent, and from 2% by weight to 7% by weight for the binder. When the amount of the conductive agent is 3% by weight or more, the effect described above can be exercised. When the amount is 18% by weight or less, decomposition of the electrolyte on the surface of the conductive agent under high temperature storage can be reduced. When the amount of the binder is 2% by weight or more, sufficient electrode strength is obtained, and when it is 7% by weight or less, an insulating portion of the electrode can be decreased.

The positive electrode can be produced by the following method, for example. First, a slurry is prepared by suspending a positive electrode active material, a conductive agent and a binder in a solvent. This slurry is applied onto both surfaces or one surface of the positive electrode current collector. Then, the applied slurry is dried to obtain a laminate of the positive electrode active material layer and the positive electrode current collector. Thereafter, this laminate is pressed. A positive electrode pressing pressure is preferably in a range of 0.15 ton/mm to 0.3 ton/mm. If the positive electrode pressing pressure is in this range, it is preferable because adhesion (peel strength) between the positive electrode active material layer and the positive electrode current collector is enhanced, and, at the same time, the elongation percentage of the positive electrode current collector is 20% or less. In this way, a positive electrode is produced. Alternatively, the positive electrode may be produced by the following method. First, a positive electrode active material, a conductive agent and a binder are mixed to obtain a mixture. The mixture is then formed into pellets. Subsequently, by arranging these pellets on the positive electrode current collector, a positive electrode can be obtained.

(2) Negative Electrode

The negative electrode can include a negative electrode current collector and a negative electrode active material layer. The negative electrode active material layer may be formed on both surfaces or one surface of the negative electrode current collector. The negative electrode active material layer may contain a negative electrode active material, and optionally a conductive agent and a binder.

The negative electrode current collector is formed of a material which is electrochemically stable at a lithium insertion and extraction potential of the negative electrode active material. The negative electrode current collector is preferably formed of copper, nickel, stainless steel or aluminum, or aluminum alloy containing one or more elements selected from Mg, Ti, Zn, Mn, Fe, Cu, and Si. The thickness of the negative electrode current collector is preferably in a range of from 5 μm to 20 μm. The negative electrode current collector having such a thickness can keep the balance between the strength of the negative electrode and lightweight performance.

The negative electrode active material in the form of, for example, particles is contained in the negative electrode. Negative electrode active material particles may be independent primary particles, secondary particles as agglomerates of primary particles, or a mixture of the independent primary particles and the secondary particles. From the viewpoint of increasing the density, it is preferable that the negative electrode active material layer contains primary particles of 5 to 50% by volume. The shape of primary particles is not limited particularly and may be, for example, a spherical shape, an elliptical shape, a flat shape, or a fibrous shape.

Examples of the negative electrode active material include a carbon material, a graphite material, a lithium alloy material, a metal oxide, and a metal sulfide, and among them, it is preferable to select a negative electrode active material in which an insertion/extraction potential of lithium ions is within a range of 1 V to 3 V based on lithium potential and which comprises one or more titanium-containing oxides selected from lithium titanium oxide, titanium oxide, niobium titanium oxide, and lithium sodium niobium titanium oxide.

Examples of the lithium titanium oxide include spinel structure lithium titanium oxide represented by the general formula $Li_{4+x}Ti_5O_{12}$ (a range of x is −1≤x≤3), and examples of ramsdellite structure lithium titanium oxide include lithium titanium oxides such as $Li_{2+x}Ti_3O_7$, $Li_{1+x}Ti_2O_4$, $Li_{1.1+x}Ti_{1.8}O_4$, $Li_{1.07+x}Ti_{1.86}O_4$, and $Li_xTiO_2$ (a range of x is 0≤x). Examples of the titanium oxide include titanium oxide having a monoclinic structure represented by the general formula $Li_xTiO_2$ (0≤x) ($TiO_2$ (B) as a precharge structure), titanium oxide having rutile structure and titanium oxide having anatase structure ($TiO_2$ as a precharge structure). Niobium titanium oxide is represented by $Li_aTiM_bNb_{2\pm\beta}O_{7\pm\sigma}$ (0≤a≤5, 0≤b≤0.3, 0≤β≤0.3, 0≤σ≤0.3, and M is at least one element selected from the group consisting of Fe, V, Mo and Ta). These can be used alone or in admixture thereof. The lithium titanium oxide is preferably a spinel structure lithium titanium oxide with an extremely small change in volume, which can be represented by the general formula $Li_{4+x}Ti_5O_{12}$ (a range of x is −1≤x≤3). By using these titanium-containing oxides, it is possible to use an aluminum foil instead of a copper foil for the negative electrode current collector, so that weight saving and cost reduction can be achieved. This is advantageous for an electrode structure as a bipolar structure.

In negative electrode active material particles, it is preferable that the average particle diameter is 1 μm or less and the specific surface area measured with a BET method using $N_2$ absorption is in a range of 3 $m^2/g$ to 200 $m^2/g$. Consequently, an affinity with an electrolyte of a negative electrode can be enhanced.

The reason for specifying the specific surface area of the negative electrode within the above range will be described. When the specific surface area is less than 3 $m^2/g$, agglomeration of particles is conspicuous, the affinity between the negative electrode and the electrolyte is lowered, and the interface resistance of the negative electrode is increased. As a result, the output characteristics and charge-and-discharge cycle characteristics are deteriorated. On the other hand, when the specific surface area is more than 50 $m^2/g$, distribution of the electrolyte is biased toward the negative electrode, and an electrolyte deficiency may occur at the positive electrode, so that the output characteristics and charge-and-discharge cycle characteristics cannot be improved. A more preferable range of the specific surface area is 5 $m^2/g$ to 50 $m^2/g$. Here, the specific surface area of the negative electrode means a surface area per 1 g of a negative electrode active material layer (except for a weight of a current collector). The negative electrode active material layer is a porous layer supported on a current collector and including a negative electrode active material, a conductive agent, and a binder.

A porosity of the negative electrode (except for the current collector) is preferably in a range of 20 to 50%. Consequently, it is possible to obtain a high-density negative electrode excellent in affinity with an electrolyte. A more preferable range of the porosity is 25 to 40%.

As the conductive agent, a carbon material may be used, for example. Examples of carbon materials include acetylene black, carbon black, coke, carbon fibers, graphite, an aluminum powder, and TiO. More preferred are coke obtained by heat treatment at 800° C. to 2000° C. and having an average particle diameter of 10 μm or less, graphite, a TiO powder, and a carbon fiber having an average fiber diameter of 1 μm or less. The BET specific surface area utilizing $N_2$ adsorption of the carbon material is preferably 10 $m^2/g$ or more.

Examples of a binder include polytetrafluoroethylene (PTFE), polyvinylidene fluoride (PVdF), fluorine rubbers, styrene butadiene rubber, and core-shell binders.

Concerning the blending ratio of the negative active material, the conductive agent, and the binder in the negative electrode, it is preferable for the negative electrode active material to be used in an amount of 80 to 95% by weight, for the conductive agent to be used in an amount of 3 to 18% by weight, and for the binder to be used in an amount of 2 to 7% by weight.

The negative electrode can be produced by the following method, for example. First, a slurry is prepared by suspending a negative electrode active material, a conductive agent and a binder in a suitable solvent. Then, this slurry is applied onto both surfaces or one surface of the negative electrode current collector. An obtained coating film on the negative electrode current collector is dried to form a negative electrode active material layer. Thereafter, the negative electrode current collector and the negative electrode active material layer formed thereon are pressed. As the negative electrode active material layer, a negative electrode active material, a conductive agent, and a binder shaped in a pellet form may be used.

(3) Container Member

As a container member, a laminate film container or metallic container may be used, for example.

The thickness of the laminate film is, for example, 0.5 mm or less, preferably 0.2 mm or less.

As the laminate film, a multilayer film including plural of resin layers and a metal layer interposed between the resin layers is used. The resin layer contains, for example, a polymer material such as polypropylene (PP), polyethylene (PE), nylon, and polyethylene terephthalate (PET). The metal layer is preferably formed of an aluminum foil or an aluminum alloy foil for attaining weight saving. The laminate film is sealed by thermal fusion bonding and thereby can be formed into the shape of the container member.

The thickness of a wall of the metallic container is, for example, 1 mm or less, more preferably 0.5 mm or less, and still more preferably 0.2 mm or less.

The metallic container is formed from aluminum, aluminum alloy, or the like, for example. The aluminum alloy preferably contains elements such as magnesium, zinc, and silicon. When the aluminum alloy contains transition metals such as iron, copper, nickel, and chromium, the content of the transition metals is preferably 100 ppm or less.

The shape of the container member is not particularly limited. The shape of the container member may be, for example, a flat type (thin type), a rectangular type, a cylindrical type, a coin type, a button type, or the like. Depending on battery dimensions, the container member may be a container member for a small battery which is mounted to a mobile electronic appliance or the like or a container member for a large battery which is mounted to a vehicle such as a two- to four-wheel automobile, a rail transportation vehicle.

(4) Negative Electrode Terminal

The negative electrode terminal can be formed of a material which is electrochemically stable at the Li insertion/extraction potential of the above negative electrode active material and has conductivity. Specific examples of the material of the negative electrode terminal include copper, nickel, stainless steel and aluminum, and aluminum alloy containing at least one element selected from the group consisting of Mg, Ti, Zn, Mn, Fe, Cu, and Si. It is preferable to use aluminum or an aluminum alloy as the material of the negative electrode terminal. The negative electrode terminal is preferably formed of the same material as that of the negative electrode current collector in order to reduce the contact resistance with the negative electrode current collector.

(5) Positive Electrode Terminal

The positive electrode terminal is formed of a material which is electrically stable in the range where the potential with respect to an oxidation-reduction potential of lithium is from 3.0 V to 4.5 V (vs.Li/Li$^+$) and has conductivity. Examples of the material of the positive electrode terminal include aluminum and aluminum alloy containing at least one element selected from the group consisting of Mg, Ti, Zn, Mn, Fe, Cu, and Si. The positive electrode terminal is preferably formed of the same material as that of the positive electrode current collector in order to reduce the contact resistance with the positive electrode current collector.

Next, the secondary battery according to the present embodiment will be described in more detail with reference to the drawings.

Figure 2:
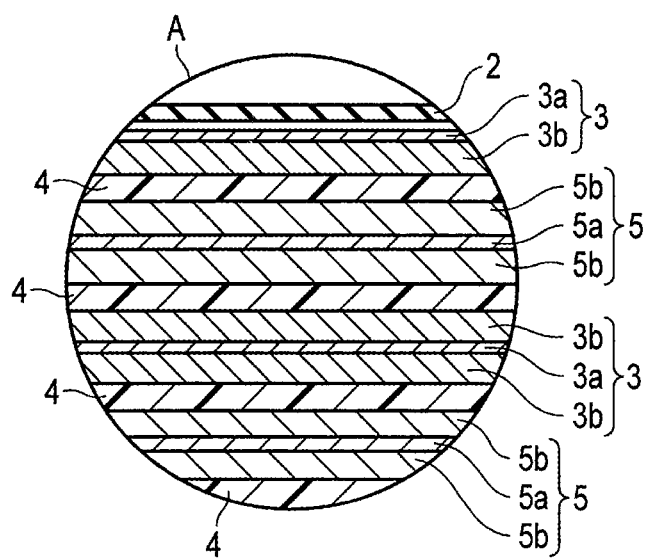
FIG. 2 is an enlarged cross-sectional view of a portion A of FIG. 1.

FIG. 1 is a cross-sectional view schematically showing an example of the secondary battery according to the second embodiment. FIG. 2 is an enlarged cross-sectional view of a portion A of the secondary battery shown in FIG. 1.

A secondary battery 100 shown in FIGS. 1 and 2 includes a bag-like container member 2 shown in FIG. 1 and an electrode group 1 shown in FIGS. 1 and 2. The secondary battery 100 may further include a nonaqueous electrolyte. The electrode group 1 is stored in the container member 2. When the secondary battery 100 includes a nonaqueous electrolyte, the nonaqueous electrolyte is held by the electrode group 1.

The bag-like container member 2 is formed of a laminate film including two resin layers and a metal layer interposed therebetween.

As shown in FIG. 1, the electrode group 1 is a flat wound electrode group. As shown in FIG. 2, the flat wound electrode group 1 includes a negative electrode 3, a composite electrolyte layer 4, and a positive electrode 5. The composite electrolyte layer 4 is interposed between the negative electrode 3 and the positive electrode 5.

The negative electrode 3 includes a negative electrode current collector 3a and a negative electrode active material layer 3b. In a portion of the negative electrode 3 located at the outermost shell of the wound electrode group 1, as shown in FIG. 2, the negative electrode active material layer 3b is formed only on the inner surface side of the negative electrode current collector 3a. In the other portion of the negative electrode 3, the negative electrode active material layers 3b are formed on both surfaces of the negative electrode current collector 3a.

The positive electrode 5 includes a positive electrode current collector 5a and positive electrode active material layers 5b formed on both surfaces thereof.

As shown in FIG. 1, the negative electrode terminal 6 and the positive electrode terminal 7 are located near an outer peripheral end of the wound electrode group 1. The negative electrode terminal 6 is connected to a portion of the negative electrode current collector 3a of the negative electrode 3 located at the outermost shell. On the other hand, the positive electrode terminal 7 is connected to the positive electrode current collector 5a of the positive electrode 5 located at the outermost shell. The negative electrode terminal 6 and the positive electrode terminal 7 are extended outside from an opening of the bag-like container member 2.

By interposing the negative electrode terminal 6 and the positive electrode terminal 7 in the opening of the bag-like container member 2 and heat-sealing, the wound electrode group 1 is sealed off.

Figure 3:
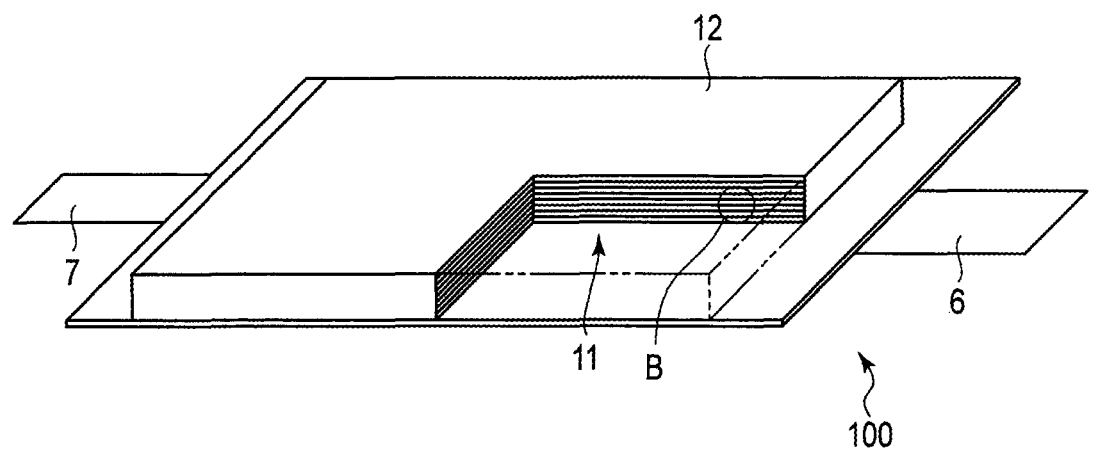
FIG. 3 is a partially broken perspective view schematically showing another example of the secondary battery according to the first embodiment.
Figure 4:
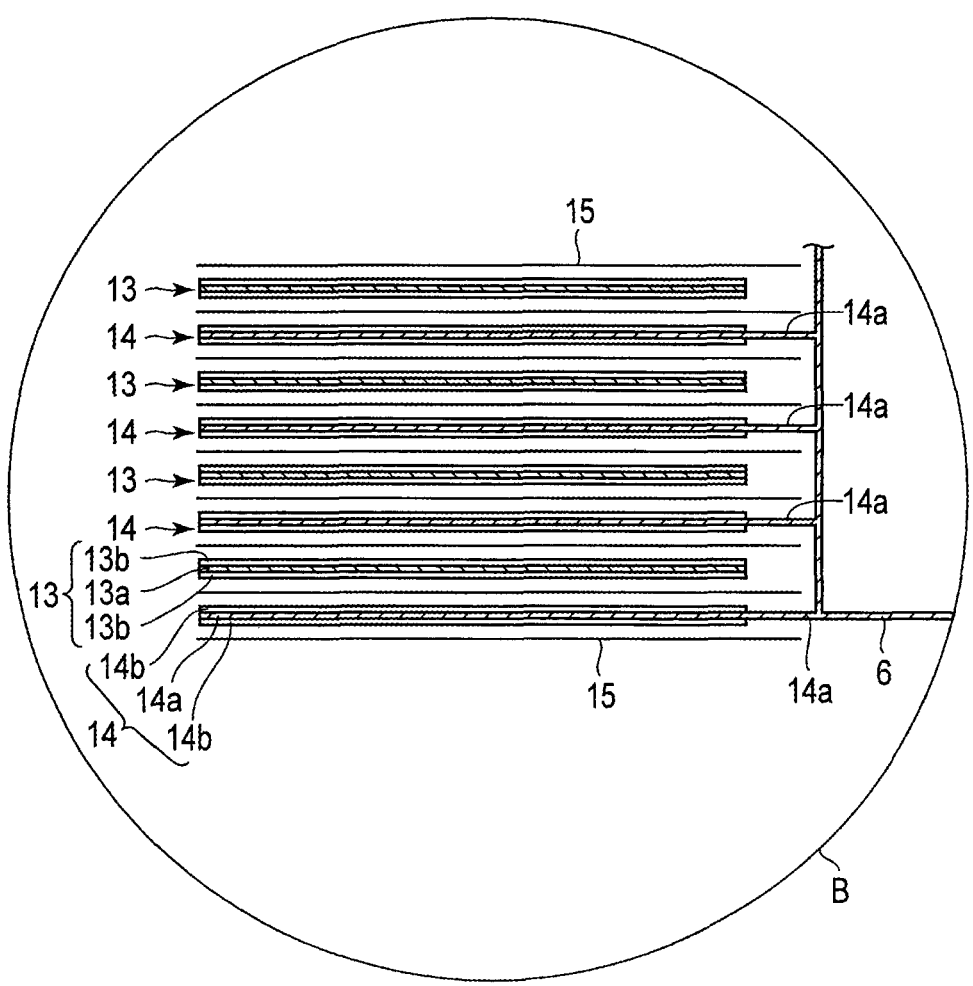
FIG. 4 is an enlarged cross-sectional view of a portion B of FIG. 3.

The secondary battery according to the present embodiment is not limited to the secondary battery having the configuration shown in FIGS. 1 and 2, and may be, for example, the battery having the configuration shown in FIGS. 3 and 4.

FIG. 3 is a partially broken perspective view schematically showing another example of the secondary battery according to the second embodiment. FIG. 4 is an enlarged cross-sectional view of a portion B of the secondary battery shown in FIG. 3.

The secondary battery 100 shown in FIGS. 3 and 4 includes an electrode group 11 shown in FIGS. 3 and 4 and a container member 12 shown in FIG. 3. The secondary battery 100 may include a nonaqueous electrolyte. The electrode group 11 is stored in the container member 12. When the secondary battery 100 includes a nonaqueous electrolyte, the nonaqueous electrolyte is held by the electrode group 11.

The container member 12 is formed of a laminate film including two resin layers and a metal layer interposed therebetween.

As shown in FIG. 4, the electrode group 11 is a stacked-type electrode group. The stacked-type electrode group 11 has a structure in which a positive electrode 13 and a negative electrode 14 are alternately stacked with a composite electrolyte 15 being interposed therebetween.

The electrode group 11 includes plural of the positive electrodes 13. Each of the positive electrodes 13 includes a positive electrode current collector 13a and positive electrode active material layers 13b supported on both surfaces of the positive electrode current collector 13a. The electrode group 11 further includes plural of the negative electrodes 14. Each of the negative electrodes 14 includes a negative electrode current collector 14a and negative electrode active material layers 14b supported on both surfaces of the negative electrode current collectors 14a. One side of the negative electrode current collector 14a of each of the negative electrodes 14 is projected from the negative electrode 14. The projected negative electrode current collector 14a is electrically connected to a belt-like negative electrode terminal 16. A leading end of the belt-like negative electrode terminal 6 is drawn to the outside from the container member 12. Further, although not shown, as for the positive electrode current collector 13a of the positive electrode 13, a side located on the opposite side of a projected side of the negative electrode current collector 14a is projected from the positive electrode 13. The positive electrode current collector 13a projected from the positive electrode 13 is electrically connected to the belt-like positive electrode terminal 7. A leading end of the belt-like positive electrode terminal 7 is located on the opposite side of the negative electrode terminal 6 and drawn to the outside from the container member 12.

Figure 5:
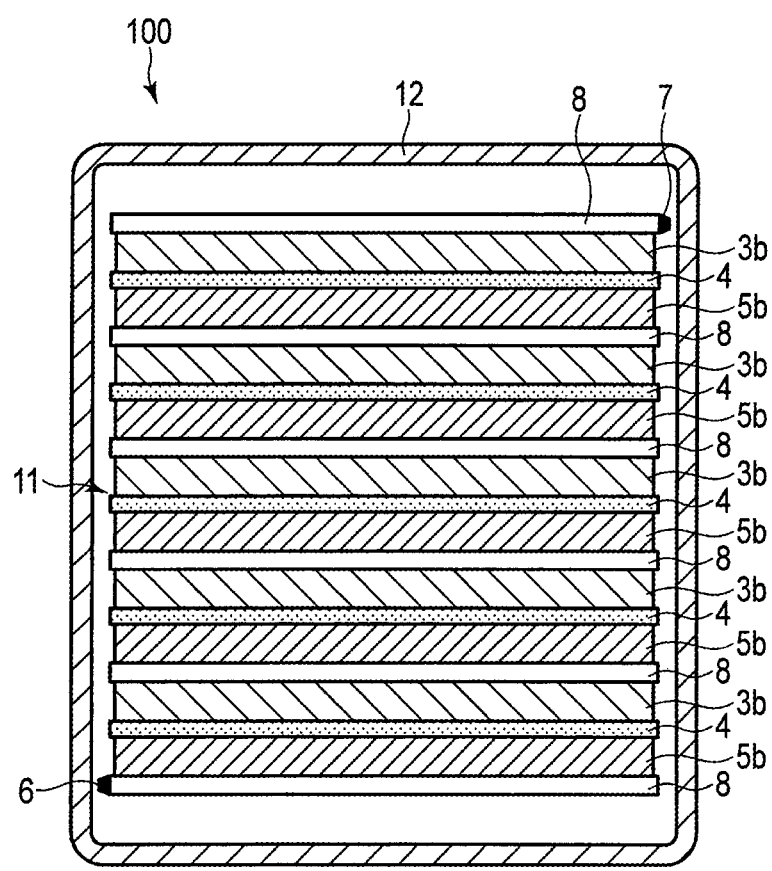
FIG. 5 is a cross-sectional view schematically showing another example of the secondary battery according to the first embodiment.

The secondary battery according to the present embodiment may have a monopolar structure as described above or may have a bipolar structure as shown in FIG. 5.

The secondary battery 100 shown in FIG. 5 is configured as follows.

The secondary battery 100 includes the electrode group 11 and the container member 12 storing the electrode group 11.

The electrode group 11 includes a first laminate in which the positive electrode active material layer 5b is formed on one surface of a current collector 8 and the negative electrode active material layer 3b is formed on the other surface. On the negative electrode active material layer 3b contained in the first laminate, the composite electrolyte layer 4 is formed.

A second laminate included at one end of the electrode group 11, for example, an upper end portion shown in FIG. 5 is a laminate in which the negative electrode active material layer 3b and the composite electrolyte layer 4 are provided on one surface of the current collector 8 in this order. The positive electrode terminal 7 is electrically connected to the current collector 8 included in the second laminate. Although not shown, the positive electrode terminal 7 is drawn to the outside from the container member 12.

A third laminate included at the other end of the electrode group 11, for example, a lower end portion shown in FIG. 5 is a laminate in which the positive electrode active material layer 5b is provided on one surface of the current collector 8. The negative electrode terminal 6 is electrically connected to the current collector 8 included in the third laminate. Although not shown, the negative electrode terminal 6 is drawn to the outside from the container member 12.

The electrode group 11 having the bipolar electrode structure shown in FIG. 5 is configured by stacking the second laminate, plural of the first laminates, and the third laminate in this order. The number of the first laminate can be appropriately changed according to the battery design.

A secondary battery having a bipolar electrode structure is compact and has high capacity, and can achieve excellent life performance, thermal stability and electrochemical stability.

The secondary battery according to the embodiment may form a battery module. The battery module includes, for example, plural of the secondary battery according to the embodiment.

In the battery module according to the embodiment, each of the battery cells may be arranged electrically connected in series, in parallel, or in a combination of in-series connection and in-parallel connection.

An example of the battery module according to the embodiment will be described with reference to the drawings.

Figure 6:
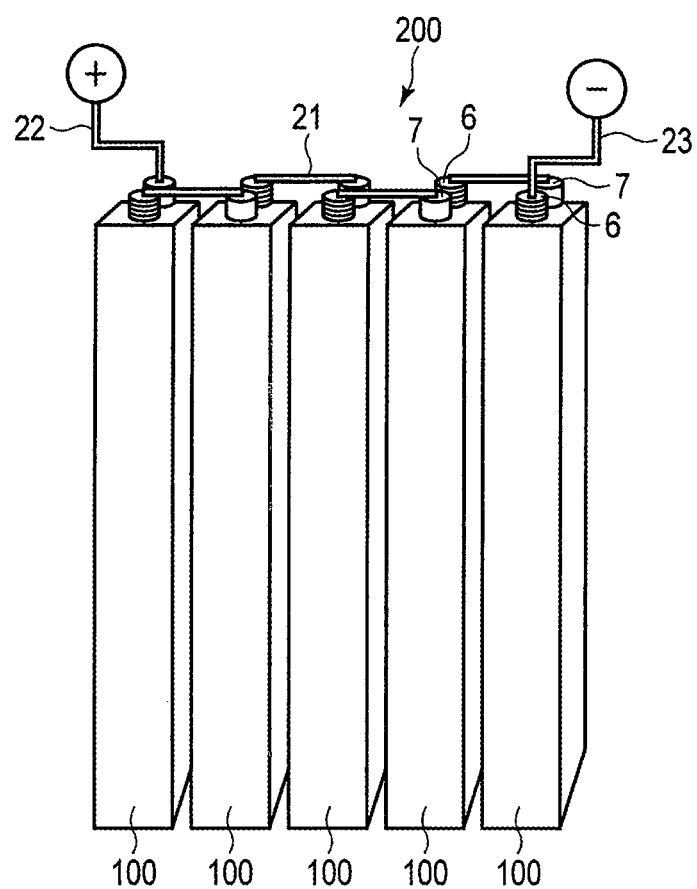
FIG. 6 is a perspective view schematically showing an example of a battery module according to the first embodiment.

FIG. 6 is a perspective view schematically showing an example of the battery module according to the embodiment. A battery module 200 shown in FIG. 6 includes five battery cells 100, four bus bars 21, a positive electrode-side lead 22, and a negative electrode-side lead 23. Each of the five battery cells 100 is a secondary battery according to the embodiment.

Each bus bar 21 connects a negative electrode terminal 6 of one battery cell 100 and a positive electrode terminal 7 of the another battery cell 100 positioned adjacent. The five battery cells 100 are thus connected in series by the four bus bars 21. That is, the battery module 200 shown in FIG. 6 is a battery module of five in-series connection.

As shown in FIG. 6, the positive electrode terminal 7 of the battery cell 100 located at one end on the left among the row of the five battery cells 100 is connected to the positive electrode-side lead 22 for external connection. In addition, the negative electrode terminal 6 of the battery cell 100 located at the other end on the right among the row of the five battery cells 100 is connected to the negative electrode-side lead 23 for external connection.

The secondary battery according to the second embodiment includes the composite electrolyte according to the first embodiment. Thus, this secondary battery is excellent in rate performance and low temperature performance.

Third Embodiment

According to a third embodiment, a battery pack is provided. The battery pack includes, for example, a single secondary battery or a battery module configured by the plural of the secondary battery.

The battery pack may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the third embodiment will be described with reference to the drawings.

Figure 7:
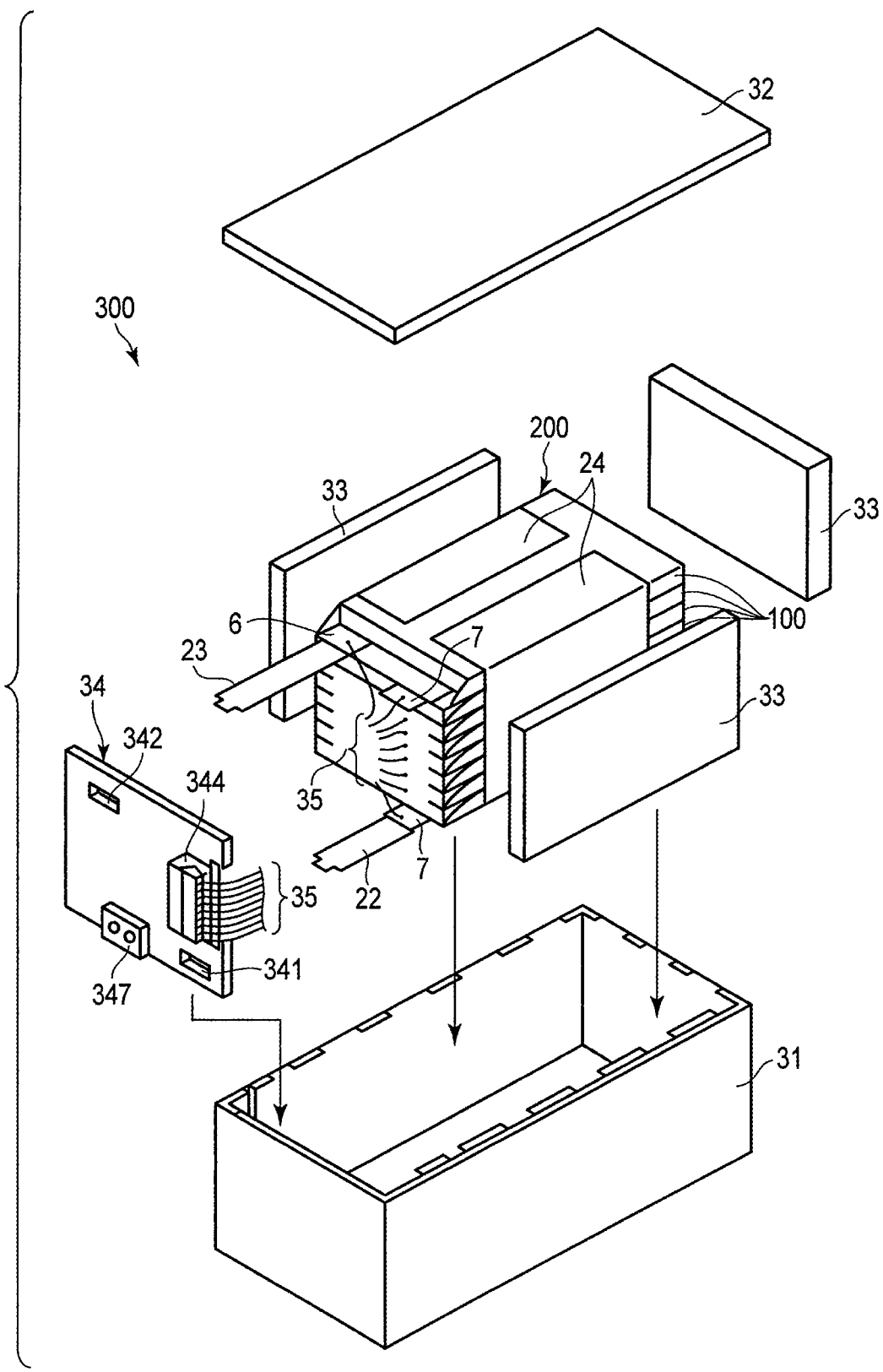
FIG. 7 is an exploded perspective view schematically showing an example of a battery pack according to a second embodiment.

FIG. 7 is an exploded perspective view schematically showing an example of the battery pack according to the third embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 is configured to house the protective sheets 33, the battery module 200, the printed wiring board 34, and the wires 35. The lid 32 covers the housing container 31 to house the battery module 200 and the like. Although not shown, opening(s) or connection terminal(s) for connecting to external device(s) and the like are provided on the housing container 31 and lid 32.

The protective sheets 33 are arranged on both inner surfaces of the housing container 31 along the long-side direction and on one inner surface of the housing container 31 along the short-side direction. The printed wiring board 34 is arranged on the other inner surface of the housing container 31 along the short-side direction. The protective sheets 33 are made of, for example, resin or rubber.

The battery module 200 includes plural battery cells 100, a positive electrode-side lead 22, a negative electrode-side lead 23, and an adhesive tape 24. The battery module 200 may alternatively include only one battery cell 100.

The battery cell 100 has, for example, a structure shown in FIGS. 1 and 2. At least one of the plural battery cells 100 is a secondary battery according to the second embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 8. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device (s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

Such a battery pack 300 is used, for example, in applications where excellent cycle performance is demanded when a large current is extracted. More specifically, the battery pack 300 is used as, for example, a power source for electronic devices, a stationary battery, an onboard battery for vehicles, or a battery for railway cars. An example of the electronic device is a digital camera. The battery pack 300 is particularly favorably used as an onboard battery.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of a motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

The battery pack according to the third embodiment includes the secondary battery according to the second embodiment. Thus, this battery pack can achieve excellent rate performance and low temperature performance.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

An example of the vehicle according to the embodiment is explained below, with reference to the drawings.

FIG. 9 is a cross-sectional view schematically showing an example of a vehicle according to the embodiment.

A vehicle 400, shown in FIG. 9 includes a vehicle body 40 and a battery pack 300 according to the embodiment.

In FIG. 9, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400.

Figure 10:
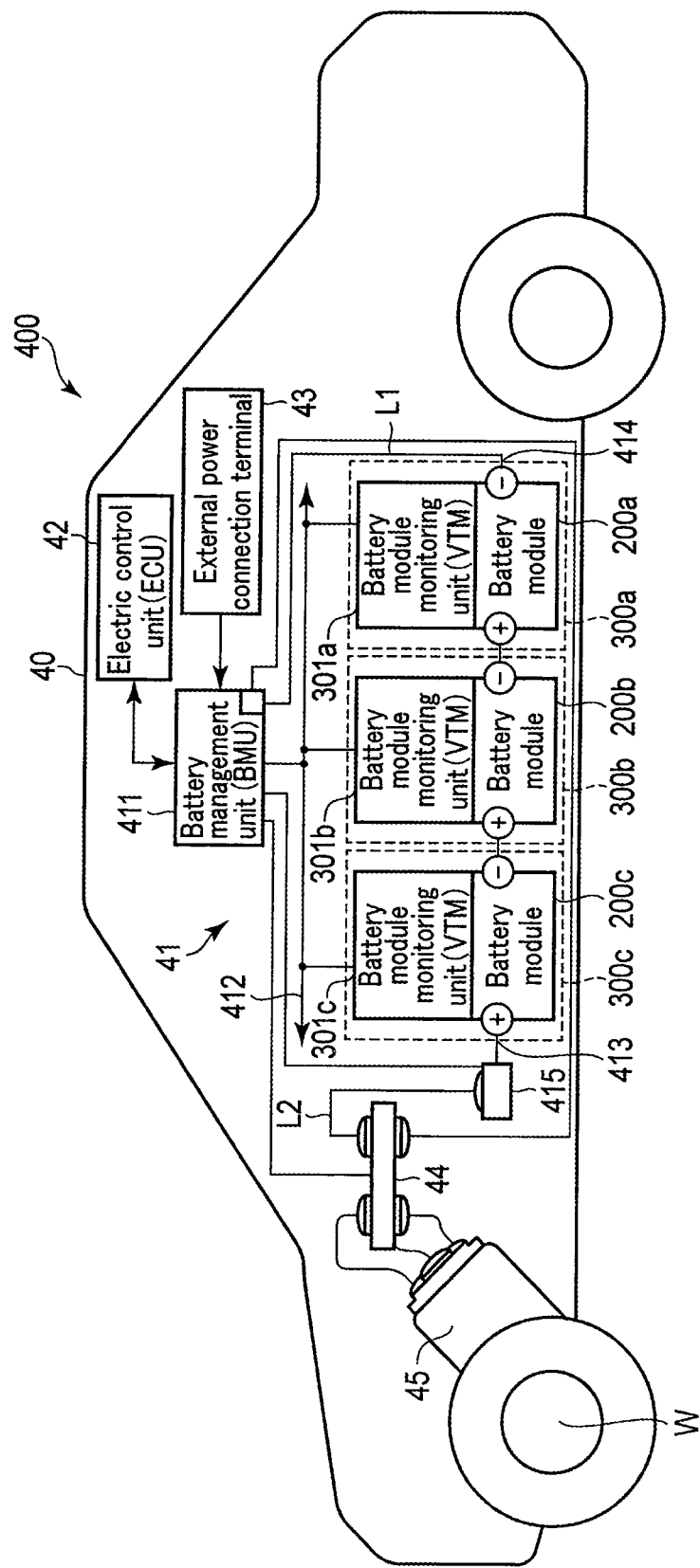
FIG. 10 is a view schematically showing another example of the vehicle according to the fourth embodiment.

Next, with reference to FIG. 10, an aspect of operation of the vehicle according to the embodiment is explained.

FIG. 10 is a view schematically showing another example of the vehicle according to the embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 10) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

A vehicle according to the fourth embodiment includes the battery pack according to the third embodiment. Thus, according to the present embodiment, it is possible to provide a vehicle equipped with a battery pack that can achieve excellent rate performance and low temperature performance.

EXAMPLES

Examples will be described blow. The embodiments are not limited to the examples to be described below.

Example 1

A secondary battery having a monopolar structure was produced by the following procedure.

<Production of Positive Electrode>

Spinel-structured lithium manganese oxide ($LiMn_2O_4$) having an average particle diameter of 10 nm and serving as a positive electrode active material, 5% by weight of a graphite powder having an average particle diameter of 6 μm and serving as a conductive agent, and 3% by weight of PVdF as a binder based on the total amount of the positive electrode were blended and dispersed in an N-methylpyrrolidone (NMP) solvent to prepare a slurry. Thereafter, this slurry was applied onto one surface of an aluminum alloy foil (purity: 99%) having a thickness of 12 μm, dried, and pressed to produce a positive electrode. In the produced positive electrode, the thickness of the positive electrode active material layer on one side was 67 µm, and the electrode density was 2.7 g/cm³.

<Production of Negative Electrode>

$Li_4Ti_5O_{12}$ particles having an average particle diameter of 0.6 µm and a specific surface area of 10 m²/g and serving as a negative electrode active material, a graphite powder having an average particle diameter of 6 µm and serving as a conductive agent, and PVdF as a binder were blended at a weight ratio of 95:3:2, and dispersed in an N-methylpyrrolidone (NMP) solvent. The resultant dispersion was stirred for 2 hours using a ball mill (rotational speed: 1,000 rpm) to prepare a slurry. The resultant slurry was applied onto one surface of an aluminum alloy foil (purity: 99.3%) having a thickness of 15 µm, dried, and heat-pressed to produce a negative electrode. In the produced negative electrode, the thickness of the negative electrode active material layer on one side was 59 µm, and the electrode density was 2.2 g/cm³. The negative electrode porosity excluding the current collector of this negative electrode was 35%.

<Preparation of Composite Electrolyte>

First, $Li_7La_3Zr_2O_{12}$ (LLZ) particles were provided as inorganic compound particles and pulverized by dry pulverization such that the average particle diameter (diameter) of primary particles of these particles was 0.1 µm. Then, the thus pulverized LLZ particles were dispersed in an N-methyl-2-pyrrolidone (NMP) solution containing 0.5% by weight of a PVdF binder. The resultant dispersion was applied onto a positive electrode active material layer and a negative electrode active material layer and dried to form a solid electrolyte layer.

Then, a solution containing a mixed solvent of propylene carbonate and diethyl carbonate (volume ratio: 1:2) in which 1.2 M of $LiPF_6$ was dissolved and a polymer body (2% by weight) of polyacrylonitrile (PAN) as a gelling agent was impregnated into the solid electrolyte layer, the positive electrode active material layer, and the negative electrode active material layer. The positive electrode and the negative electrode impregnated with the solution as described above were heated at 60° C. for 25 hours to prepare a gelled composite electrolyte. At this time, amounts of organic components in the electrode and the composite electrolyte were adjusted so as to be 3% and 4% by weight, respectively. The organic component means the solution containing a mixed solvent of propylene carbonate and diethyl carbonate (volume ratio: 1:2) in which 1.2 M of $LiPF_6$ was dissolved and a polymer body (2% by weight) of polyacrylonitrile (PAN) as a gelling agent. The weight ratio of inorganic particles contained in the composite electrolyte, the gelling agent as a binder, and the organic component was 94.3:1.9:3.8.

<Measurement of Ion Conductivity of Composite Electrolyte>

A composite electrolyte having a constant film thickness is prepared on an aluminum alloy foil (purity: 99.3%) of 15 µm to provide an ion block electrode. An alternating current impedance measurement of the prepared composite electrolyte is carried out, and the ionic conductivity can be calculated from the obtained resistance value.

<Production of Secondary Battery>

The positive electrode and the negative electrode obtained above were stacked such that the composite electrolyte provided on the positive electrode active material layer and the composite electrolyte provided on the negative electrode active material layer faced each other, thus obtaining a laminate. Then, this laminate was spirally wound such that the negative electrode was located at the outermost periphery, thus producing an electrode group. This was heat-pressed at 90° C. to produce a flat electrode group. The obtained electrode group was stored in a thin metal can formed of stainless steel and having a thickness of 0.25 mm. In that metal can, a valve for leaking gas when the internal pressure became 2 atmospheric pressure or more was installed.

<Rate Performance Evaluation>

Batteries were subjected to a rate test under an environment of 25° C. In charging and discharging, first, the battery was charged to 3.0 V at 1 A and then discharged to 1.7 V at 1 A to confirm the capacity of the battery, and then a discharge current was discharged at 20 A to confirm the capacity of the battery.

<Low Temperature Performance Evaluation>

In order to evaluate the characteristics at low temperature, first the battery was charged to 3.0 V at 1 A under an environment of 25° C. Thereafter, after waiting for 5 hours under an environment of 25° C. or −30° C., the battery was discharged to 1.7 V at 1 A to confirm the capacity of the battery. A discharge capacity retention ratio at −30° C. with respect to the measured discharge capacity at 25° C. was evaluated.

<Measurement of Weight of Solvent Contained in Inorganic Compound Particles>

The positive electrode and the negative electrode were taken out from the produced secondary battery and subjected to TG measurement and DSC measurement according to the method described in the first embodiment. These results are shown in FIGS. 11 and 12. FIG. 11 is a graph showing results of thermogravimetric measurements. FIG. 12 is a graph showing results of differential scanning calorimetry. FIGS. 11 and 12 also show measurement results of Example 7 and Comparative Example 1 described later.

From the measurement results shown in FIGS. 11 and 12, the weight of a solvent contained in inorganic compound particles relative to the total weight of the inorganic compound particles and the solvent according to Example 1 was measured and found to be 3% by weight.

The above results are shown in Table 1 below. The following Table 1 also shows results of Examples 2 to 9 and Comparative Examples 1 to 3 described later. In Table 1, the column of "firing after pulverization" shows firing conditions after pulverization of inorganic compound particles. "-" indicates that firing was not performed. The column of "solvent content" indicates the ratio of the weight of the solvent to the total weight of the inorganic compound particles and the solvent contained in the inorganic compound particles. The column of "gelation time" indicates the time taken for a mixture of an organic electrolyte and a binder to be gelled. The column of "25° C. rate performance 1 C/20 C capacity retention ratio" indicates the capacity retention ratio of the discharge capacity at 1 C to a measured discharge capacity at 20 C. The column "low temperature performance −30° C./25° C. capacity retention ratio" indicates the capacity retention ratio of the discharge capacity at −30° C. to the discharge capacity at 25° C.

Examples 2 to 5

A composite electrolyte was prepared in the same manner as described in Example 1 except that inorganic compound particles of the type shown in Table 1 were used as the inorganic compound particles, and the ion conductivity was measured.

Also, using this composite electrolyte, a secondary battery was produced in the same manner as described in Example 1, and the rate performance and the low temperature performance were evaluated.

Example 6

A composite electrolyte was prepared in the same manner as described in Example 1 except that LLZ as inorganic compound particles was pulverized by bead mill (wet type) pulverization using pure water, and then fired at a temperature of 500° C. for 12 hours, and the ion conductivity was measured. The bead's rotation rate in the bead mill pulverization was 800 rpm, and pulverization was performed for 60 minutes at a flow rate of 30 ml/min.

Also, using this composite electrolyte, a secondary battery was produced in the same manner as described in Example 1, and the rate performance and the low temperature performance were evaluated.

Example 7

A composite electrolyte was prepared in the same manner as described in Example 1 except that LLZ as inorganic compound particles was pulverized by bead mill (wet type) pulverization using ethanol, and then fired at a temperature of 500° C. for 12 hours, and the ion conductivity was measured. The bead's rotation rate in the bead mill pulverization was 800 rpm, and pulverization was performed for 60 minutes at a flow rate of 30 ml/min.

Also, using this composite electrolyte, a secondary battery was produced in the same manner as described in Example 1, and the rate performance and the low temperature performance were evaluated.

Example 8

A secondary battery having a bipolar structure was produced by the following procedure.

In order to investigate the battery performance of a secondary battery having a bipolar electrode structure, there was produced an electrode in which the positive electrode active material layer described in Example 1 was formed on one surface of an aluminum current collector, and the negative electrode active material layer described in Example 1 was formed on the other surface. The solid electrolyte described in Example 1 was coated on the positive and negative electrode surfaces using a coating spray. Thereafter, a solution before gelation of a mixed solvent of propylene carbonate (PC) and diethyl carbonate (volume ratio: 1:2) in which 1 M of $LiPF_6$ was dissolved and polyacrylonitrile polymer body (2% by weight) was impregnated into voids between the positive electrode active material layer and the negative electrode active material layer. Thereafter, the solution was gelled by heating to form a composite electrolyte, and a secondary battery having a five-layer bipolar electrode structure was produced.

The rate performance and low temperature performance of the secondary battery were evaluated by the above method.

Comparative Example 1

A composite electrolyte was prepared in the same manner as described in Example 6 except that firing was not performed after pulverizing the inorganic compound particles, and the ion conductivity was measured.

Also, using this composite electrolyte, a secondary battery was produced in the same manner as described in Example 1, and the rate performance and the low temperature performance were evaluated.

Comparative Example 2

A composite electrolyte was prepared in the same manner as described in Example 7 except that firing was not performed after pulverizing the inorganic compound particles, and the ion conductivity was measured.

Also, using this composite electrolyte, a secondary battery was produced in the same manner as described in Example 1, and the rate performance and the low temperature performance were evaluated.

Comparative Example 3

A composite electrolyte was prepared in the same manner as described in Example 6 except that after pulverizing the inorganic compound particles, firing was performed at a temperature of 100° C. for 12 hours, and the ion conductivity was measured.

Also, using this composite electrolyte, a secondary battery was produced in the same manner as described in Example 1, and the rate performance and the low temperature performance were evaluated.

Comparative Example 4

A composite electrolyte was prepared in the same manner as described in Example 6 except that after pulverizing the inorganic compound particles, firing was performed at a temperature of 800° C. for 2 hours, and the ion conductivity was measured.

Also, using this composite electrolyte, a secondary battery was produced in the same manner as described in Example 1, and the rate performance and the low temperature performance were evaluated.

TABLE 1

| | Battery structure | Type of inorganic compound particle | Method for pulverizing inorganic compound particles | Firing after pulverization | Average particle diameter of inorganic compound particles (μm) | Solvent content (wt %) | Gelation time (h) | Ion conductivity of composite electrolyte (mS/cm) | 25° C. rate performance 1 C/20 C capacity retention ratio (%) | Low temperature performance −30° C./25° C. capacity retention ratio (%) |
|---|---|---|---|---|---|---|---|---|---|---|
| Example 1 | Monopolar | $Li_7La_3Zr_2O_{12}$ | Dry | — | 0.10 | 3 | 25 | 5.97 | 74.2 | 70.3 |
| Example 2 | Monopolar | $Li_{1.4}Al_{0.4}Ti_{1.6}(PO_4)_3$ | Dry | — | 0.18 | 0.6 | 21 | 5.92 | 73.6 | 69.8 |

TABLE 1-continued

|  | Battery structure | Type of inorganic compound particle | Method for pulverizing inorganic compound particles | Firing after pulverization | Average particle diameter of inorganic compound particles (μm) | Solvent content (wt %) | Gelation time (h) | Ion conductivity of composite electrolyte (mS/cm) | 25° C. rate performance 1 C/20 C capacity retention ratio (%) | Low temperature performance −30° C./25° C. capacity retention ratio (%) |
|---|---|---|---|---|---|---|---|---|---|---|
| Example 3 | Monopolar | $Li_{0.5}La_{0.5}TiO_3$ | Dry | — | 0.25 | 1.7 | 21 | 6.12 | 74.5 | 70.8 |
| Example 4 | Monopolar | $Li_{3.6}Si_{0.6}PO_4$ | Dry | — | 0.20 | 2.4 | 24 | 5.87 | 74.4 | 69.9 |
| Example 5 | Monopolar | LIPON | Dry | — | 0.15 | 0.4 | 20 | 5.73 | 73.5 | 69.1 |
| Example 6 | Monopolar | $Li_7La_3Zr_2O_{12}$ | Wet (Pure water) | 500° C. 12 hours | 0.38 | 3.9 | 28 | 4.26 | 71.8 | 67.2 |
| Example 7 | Monopolar | $Li_7La_3Zr_2O_{12}$ | Wet (Ethanol) | 500° C. 12 hours | 0.42 | 2.6 | 27 | 4.49 | 72.2 | 67.9 |
| Example 8 | Bipolar | $Li_7La_3Zr_2O_{12}$ | Dry | — | 0.10 | 3 | 25 | 5.97 | 74.2 | 70.3 |
| Comparative Example 1 | Monopolar | $Li_7La_3Zr_2O_{12}$ | Wet (Pure water) | — | 0.20 | 16 | — (Not gelled) | 0.21 | 30.2 | 22 |
| Comparative Example 2 | Monopolar | $Li_7La_3Zr_2O_{12}$ | Wet (Ethanol) | — | 0.19 | 10 | — (Not gelled) | 0.16 | 30.4 | 21.5 |
| Comparative Example 3 | Monopolar | $Li_7La_3Zr_2O_{12}$ | Wet (Pure water) | 100° C. 12 hours | 0.12 | 8 | — (Not gelled) | 1.12 | 33.7 | 30.9 |
| Comparative Example 4 | Monopolar | $Li_7La_3Zr_2O_{12}$ | Wet (Pure water) | 800° C. 2 hours | 5.0 | 5 | 30 | 4.13 | 60.1 | 54.6 |

The following is seen from Table 1.

Examples 1 to 5 show that excellent rate performance and low temperature performance can be achieved even if the types of inorganic compound particles are variously changed.

From the comparison between Examples 1, 6, and 7 and Comparative Examples 3 and 4, it can be seen that even when inorganic compound particles are pulverized by wet pulverization, by firing at appropriate temperature and time after pulverization of the particles, the amount of the solvent in the inorganic compound particles can be set to 0.1% by weight or more and less than 8% by weight.

As shown in Example 8, excellent rate performance and low temperature performance could be achieved even with a secondary battery having a bipolar structure.

From the comparison between Example 1 and Comparative Examples 1 and 2, it can be seen that excellent rate performance and low temperature performance cannot be achieved unless the mixture of the organic electrolyte and the binder is gelled.

According to at least one embodiment and example described above, a composite electrolyte is provided. This composite electrolyte includes inorganic compound particles having lithium ion conductivity at 25° C. of $1 \times 10^{-10}$ S/cm or more and including a solvent, an organic electrolyte, and a binder, the average particle diameter of the inorganic compound particles is 0.1 μm or more and less than 5 μm, and the ratio of the weight of the solvent to the total weight of the inorganic compound particles and the solvent is 0.1% by weight or more and less than 8% by weight. Thus, it is possible to obtain a composite electrolyte capable of realizing a secondary battery excellent in rate performance and low temperature performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A composite electrolyte comprising:
    inorganic compound particles having lithium ion conductivity at 25° C. of $1 \times 10^{-10}$ S/cm or more and comprising a solvent;
    an organic electrolyte; and
    a binder,
    wherein an average particle diameter of the inorganic compound particles is 0.1 μm or more and less than 5 μm,
    the solvent is present inside the inorganic compound particles and present on surfaces of the inorganic compound particles,
    and a ratio of a weight of the solvent to a total weight of the inorganic compound particles and the solvent is 0.1% by weight or more and less than 8% by weight.

2. The composite electrolyte according to claim 1, comprising a gel-like composition comprising the organic electrolyte and the binder.

3. The composite electrolyte according to claim 2, wherein the lithium ion conductivity at 25° C. of the inorganic compound particles is $2 \times 10^{-2}$ S/cm or less.

4. The composite electrolyte according to claim 1, wherein the ratio of the weight of the solvent to the total weight of the inorganic compound particles and the solvent is from 0.1% by weight to 2% by weight.

5. The composite electrolyte according to claim 4, wherein the lithium ion conductivity at 25° C. of the inorganic compound particles is $2 \times 10^{-2}$ S/cm or less.

6. The composite electrolyte according to claim 1, wherein the lithium ion conductivity at 25° C. of the inorganic compound particles is $2 \times 10^{-2}$ S/cm or less.

7. The composite electrolyte according to claim 1, wherein the inorganic compound particles are at least one selected from a group consisting of particles of $Li_{5+x}A_yLa_{3-y}M_2O_{12}$ (A is at least one selected from the group consisting of Ca, Sr and Ba, M is at least one selected from the group consisting of Nb and Ta, a range of x is 0≤x<0.8, and a range of y is 0≤y<2), particles of $Li_3M_{2-x}Zr_2O_{12}$ (M is at least one selected from the group consisting of Ta and Nb, a range of x is 0≤x<0.8), particles of $Li_{7-3x}Al_xLa_3Zr_3O_{12}$ (a range of x is 0≤x<0.8), and particles of $Li_7La_3Zr_2O_{12}$.

8. The composite electrolyte according to claim 7, wherein the lithium ion conductivity at 25° C. of the inorganic compound particles is $2\times10^{-2}$ S/cm or less.

9. The composite electrolyte according to claim 1, wherein the organic electrolyte comprises at least one organic solvent selected from a group consisting of propylene carbonate, ethylene carbonate, diethyl carbonate, and methylethyl carbonate.

10. The composite electrolyte according to claim 9, wherein the lithium ion conductivity at 25° C. of the inorganic compound particles is $2\times10^{-2}$ S/cm or less.

11. The composite electrolyte according to claim 1, wherein the solvent is at least one selected from a group consisting of a polar organic solvent and a nonpolar organic solvent.

12. The composite electrolyte according to claim 1, wherein the average particle diameter of the inorganic compound particles is 0.1 μm or more and less than 2 μm.

13. The composite electrolyte according to claim 1, wherein the inorganic compound particles include at least one selected from the group consisting of a sulfide-based $Li_2SeP_2S_5$ glass ceramic and an inorganic compound, the inorganic compound is an amorphous LIPON or has a perovskite type structure, a LiSICON type structure, a NASICON structure, or a garnet type structure.

14. A secondary battery comprising:
a positive electrode;
a negative electrode; and
the composite electrolyte according to claim 1.

15. The secondary battery according to claim 14, wherein the lithium ion conductivity at 25° C. of the inorganic compound particles is $2\times10^{-2}$ S/cm or less.

16. A battery pack comprising the secondary battery according to claim 14.

17. The battery pack according to claim 16, further comprising:
an external power distribution terminal; and
a protective circuit.

18. The battery pack according to claim 16, comprising plural of the secondary batteries, wherein the secondary batteries are electrically connected in series, in parallel, or in combination of in series and in parallel.

19. A vehicle comprising the battery pack according to claim 16.

20. The vehicle according to claim 19, which comprises a mechanism configured to convert kinetic energy of the vehicle into regenerative energy.

* * * * *